US012761388B2

(12) United States Patent
Hirabayashi et al.

(10) Patent No.: US 12,761,388 B2
(45) Date of Patent: Oct. 13, 2026

(54) COMBINATION OF X AND Y DIPOLE WAVEFORMS THAT ENHANCES EVENT SIGNALS IN THE GEOLOGICAL STRATUM

(71) Applicant: Schlumberger Technology Corporation, Sugar Land, TX (US)

(72) Inventors: Nobuyasu Hirabayashi, Sugar Land, TX (US); Naoki Sakiyama, Sugar Land, TX (US); Manish Lal Khaitan, Crawley (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 79 days.

(21) Appl. No.: 18/928,397

(22) Filed: Oct. 28, 2024

(65) Prior Publication Data

US 2026/0118541 A1 Apr. 30, 2026

(51) Int. Cl.
*G01V 1/50* (2006.01)

(52) U.S. Cl.
CPC .................................... *G01V 1/50* (2013.01)

(58) Field of Classification Search
CPC ................................ G01V 1/50; G01V 1/284
USPC ........................................................ 367/25
See application file for complete search history.

(56) References Cited

U.S. PATENT DOCUMENTS 10,613,242 B2 4/2020 Hirabayashi
10,768,329 B2 9/2020 Hirabayashi
2004/0158997 A1* 8/2004 Tang .................... E21B 47/026 33/304
2011/0019501 A1* 1/2011 Market .................... G01V 1/50 367/34
2012/0163121 A1* 6/2012 Hardage .................. G01V 1/38 367/21
2013/0094325 A1* 4/2013 Mateeva .................. G01V 1/48 367/35
2018/0284308 A1* 10/2018 Hirabayashi ............. G01V 1/50
2019/0179048 A1 6/2019 Syresin
2022/0075087 A1* 3/2022 Wang ....................... G01V 1/50
2023/0221453 A1* 7/2023 Hirabayashi ............. G01V 1/46 367/21

FOREIGN PATENT DOCUMENTS

CN 106526678 A * 3/2017 ............... G01V 1/50
CN 114779346 A * 7/2022 ............... G01V 1/40

OTHER PUBLICATIONS

CN-114779346-A (machine translation) (Year: 2022).*
CN-106526678-A (machine translation) (Year: 2017).*
Van Kleef et al. ("Reservoir Structural Imaging Using Azimuthal Dipole Sonic And Vertical Seismic Profiling." Abu Dhabi International Petroleum Exhibition and Conference. SPE, 2020., "Van Kleef") (Year: 2020).*
Hirabayashi N., "Beamform processing for sonic imaging using monopole and dipole sources", Geophysics, Jan. 2021, pp. D1-D14, vol. 86.
Hirabayashi N. et al., "Characteristics of waveforms recorded by azimuthally spaced hydrophones of sonic logging tool for incident plane waves", Geophysics, Nov. 2017, pp. D353-D368, vol. 82.

* cited by examiner

*Primary Examiner* — Yuqing Xiao
*Assistant Examiner* — Christopher Richard Walker
(74) *Attorney, Agent, or Firm* — Jeffrey D. Frantz

(57) ABSTRACT

Embodiments presented provide for processing of sonic images. In specific embodiments, an automated method for separation of upper and lower reflector signals is presented.

18 Claims, 8 Drawing Sheets

COMBINATION OF X AND Y DIPOLE WAVEFORMS THAT ENHANCES EVENT SIGNALS IN THE GEOLOGICAL STRATUM

CROSS REFERENCE TO RELATED APPLICATIONS

None.

FIELD OF THE DISCLOSURE

Aspects of the disclosure relate to sonic logging tools. More specifically, aspects of the disclosure relate to combination X and Y dipole waveforms that enhance event signals in the geological stratum.

BACKGROUND

Waveform processing in sonic logging tools plays a critical role in evaluating geological strata around boreholes. These tools utilize acoustic waves to image and map the subsurface structures, providing valuable information for various applications such as oil and gas exploration, mineral prospecting, and geotechnical investigations. By sending acoustic signals down the borehole and recording the reflected waves, sonic logging tools can create detailed images of the geological formations. The accuracy and effectiveness of these images depend on the advanced processing of the acquired waveforms, which involves complex algorithms and techniques to enhance the quality of the data.

Traditionally, dipole measurements are acquired separately with independent directional sources and processed independently. This conventional measuring technique can provide some details of the geological stratum; however, many times operators require or desire more detail.

Waveform processing in sonic logging tools faces several challenges. One of the main problems is the presence of noise and interference in the acquired signals, which can obscure important geological features and lead to inaccurate interpretations. Additionally, the complexity of the subsurface formations can make it difficult to distinguish between different types of geological structures, requiring sophisticated algorithms and high computational power to achieve reliable results. Another issue is the limited resolution of the tools, which can affect the ability to detect small or subtle features in the geological strata. Finally, the economic costs associated with the deployment and operation of sonic logging tools can be substantial, particularly in remote or challenging environments, making it essential to continuously improve the efficiency and effectiveness of these technologies.

There is a need to provide an apparatus and analysis methods that provide for superior analysis capabilities compared to conventional apparatus and methods.

There is a further need to provide apparatus and methods that do not have the drawbacks discussed above, namely the ability to distinguish noise signals from signals that provide useful information.

There is a still further need to reduce economic costs associated with operations and apparatus described above with conventional tools.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a method for processing sonic images is disclosed. The method may comprise sending a sonic signal into a geological stratum. The method may further comprise receiving a reflected sonic signal from the geological stratum. The method may further comprise filtering the reflected sonic signal to produce a filtered waveform. The method may further comprise performing a FK filtering on the filtered waveform to produce FK filtered data, wherein purely horizontal waves are kept in one of an up-going or a down-going wave. The method may further comprise applying a migration of the FK filtered data. The method may further comprise creating a migration image of data after the migration of the FK filtered data. The method may further comprise performing a derivative of a depth position on the data of the migration image to produce derivative results. The method may further comprise adjusting the derivative results to earth coordinates.

In another example embodiment, a method for analysis of an acoustic signal is disclosed. The method may comprise placing a multi-azimuth logging tool within a geological stratum to be evaluated. The method may further comprise activating the multi-azimuth logging tool and sending a signal into the geological stratum. The method may further comprise receiving reflected signals by the multi-azimuth logging tool. The method may further comprise stacking waveforms of the reflected signal. The method may further comprise performing a polarity modification of the received reflected signals. The method may further comprise combining polarity modified signals for both X and Y dipole waveforms.

In another example embodiment, a method for analysis of an acoustic signal within a wellbore for a hydrocarbon recovery project is disclosed. The method may comprise placing a multi-azimuth logging tool within the wellbore in a geological stratum to be evaluated. The method may also comprise sending signals into the geological stratum for at least two sources, wherein a first source is a X dipole source and a second source is a Y dipole source. The method may also comprise receiving reflected signals from the geological stratum emitted by the X dipole source and Y dipole source by receivers of the multi-azimuth logging tool. The method may also comprise stacking waveforms of the reflected signals. The method may also comprise performing at least one polarity modification of the received reflected signals. The method may also comprise combining polarity modified signals for both X and Y dipole waveforms.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted; however, that the appended drawings illustrate only typical embodiments of this disclosure and are; therefore, not be considered limiting of its scope, for the disclosure may admit to other equally effective embodiments.

Figure 1:
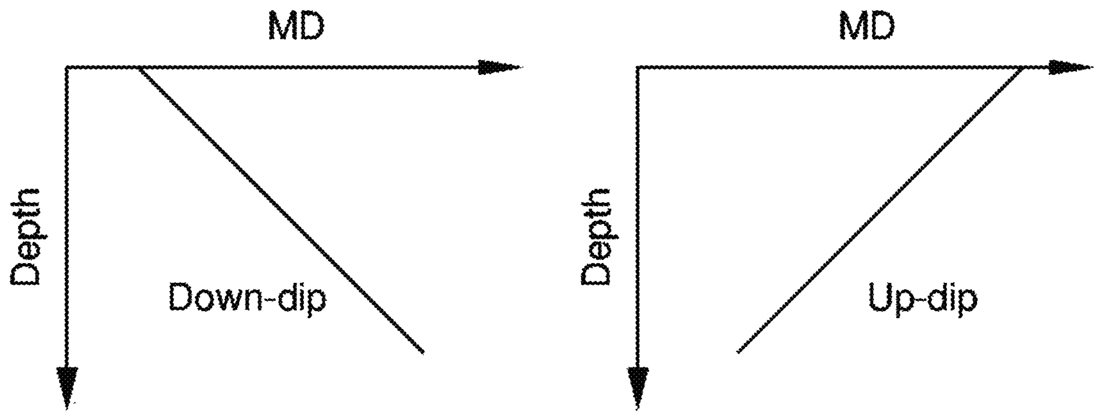
FIG. 1 is a series of migration images for the down and up-going wave forms.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood; however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer, or section. Terms such as "first", "second", and other numerical terms, when used herein, do not imply a sequence or order unless clearly indicated by the context. Thus, a first element, component, region, layer, or section discussed herein could be termed a second element, component, region, layer, or section without departing from the teachings of the example embodiments.

When an element or layer is referred to as being "on", "engaged to", "connected to", or "coupled to" another element or layer, it may be directly on, engaged, connected, coupled to the other element or layer, or interleaving elements or layers may be present. In contrast, when an element is referred to as being "directly on", "directly engaged to", "directly connected to", or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood; however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Aspects of the disclosure relate to the processing of acoustic signals. In embodiments, these acoustic signals are generated from a sonic logging tool. The acoustic signals received are generally related to reflected signals that occur from geological structures underneath the Earth's surface.

In embodiments, signals can be separated into two types of signals, the types of signals differentiated in the direction of travel. In some instances, the waveforms may be separated into "down-going" waves or "up-going" waves. Conventionally, these waves contain a wealth of information that may be used by engineers and scientists. Unfortunately, the information contained within the reflected waves may also include less desirable information. Other less desirable information may include noise generated by the environment that is generally not related to any structure within the geological stratum. To handle such extraneous information, it has been found that filtering of the signals that return can provide a benefit in that such extraneous information may be segregated and removed from further analysis.

Figure 4:
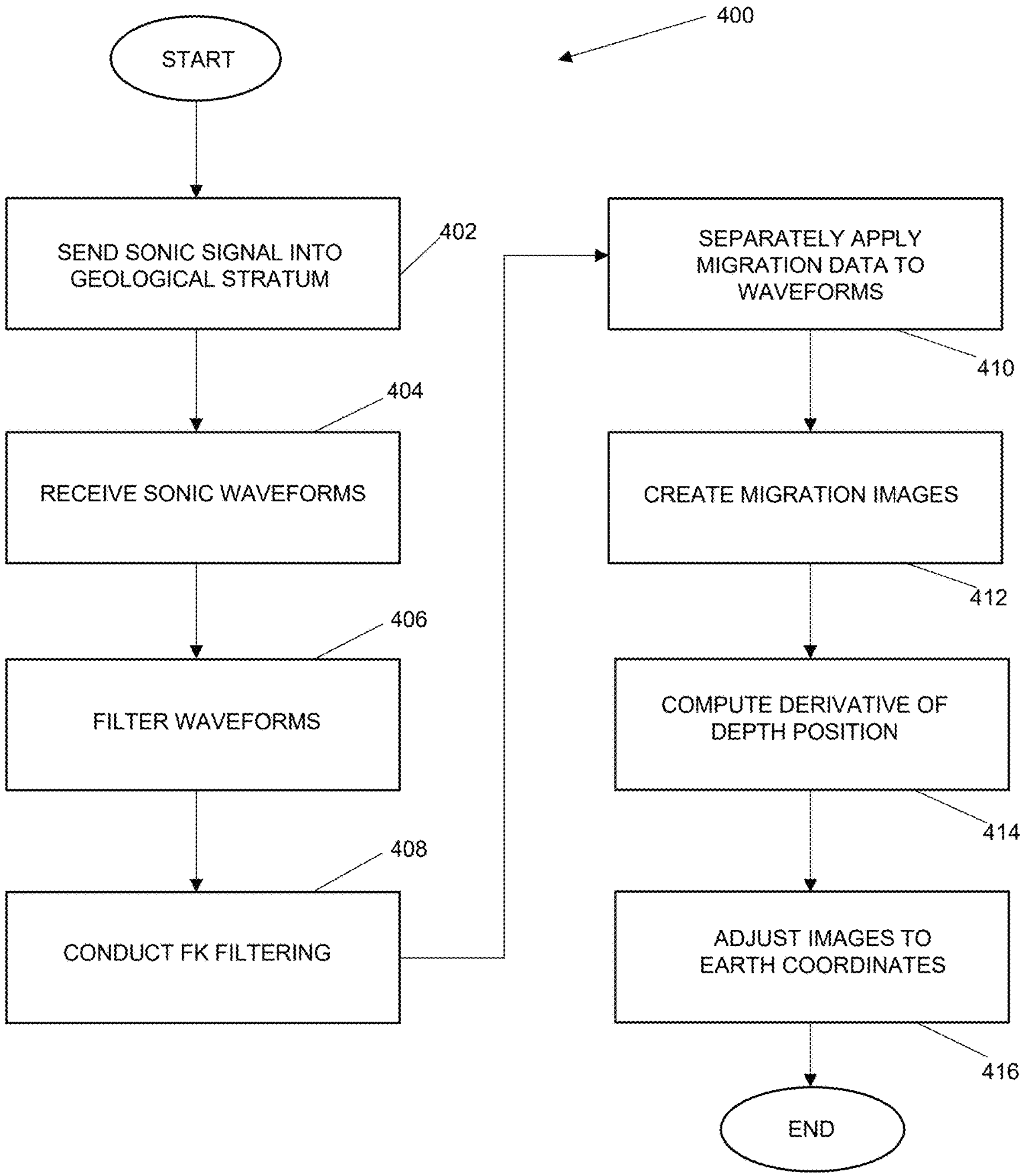
FIG. 4 is a method of automated upper and lower reflector separation for sonic imaging

In one aspect of the disclosure, referring to FIG. 4, a method 400 is illustrated. In this method, a sonic signal is sent into the geological stratum at 402. The sonic waveform is then received at a receiver that has been located at a known position at 404. The returning waveform may be simple or complex and the data contained therein may be processed to determine the presence of geological features. In embodiments, the returning waveform may be recorded. In other instances, further processing may occur in the field location. At 406, the received sonic waveforms are filtered to produce filtered waveforms. At 408, the filtered waveform data is then subjected to an FK filtering. FK filtering is used to take data that has been received (and filtered) that exists in the time and displacement domain and converts the data into a frequency and wave number domain. In this FK filtering, up-going and down-going waves in a common offset, gathers are separated. A gather is defined as a collection of seismic traces that have a common geometric attribute. In embodiments, the common geometric attribute may be a common depth location or common mid-point. The purely horizontal waves are kept in either up- or down-going waves, per selection of the scientist or operator.

Continuing with the method 400, migration of the data is separately applied to the up-going and down-going waves at 410, in the coordinates of the measurement depth and the depth from the borehole.

The data from step 410 may be then turned into migration images at 412. Migration images for the up- and down-going waves are combined in a single image so that the down- and up-going images are on the top and bottom sides of the single image where the measurement position (well trajectory) is located at the center. Here, the image of the down-going waves is flipped as up-side down.

At 414, the method continues with computing a derivative of the depth position of the well, using the formula:

$$f(x) = \frac{dz(x)}{dx} \quad \text{Equation 1}$$

where x is measurement position, and z is the depth of the well position. By definition, when f(x)<0 (where the well goes shallower), the image is flipped across the center. The method continues, at 416, with adjusting the image to Earth coordinates.

Example Embodiment

Referring to FIG. 1, a depiction of migration images is illustrated according to reflected, received, and filtered waveforms from a seismic evaluation. As can be seen in FIG. 1, according to step 410, migration images for both the down and up-going waves are illustrated. At the left side of FIG. 1, down-dip data is illustrated. At the right side of FIG. 1, up-dip data is illustrated.

Figure 2:
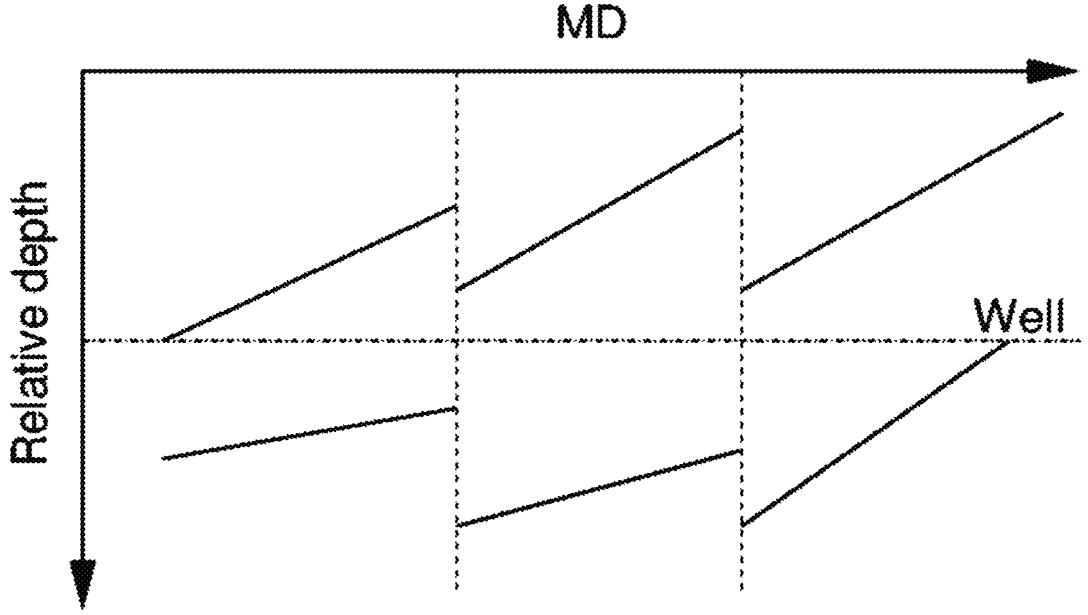
FIG. 2 is a combined image wherein down and up going waves are located on the upper and lower sides of the combined image across the wellbore where the down-going image is up-side down.

Referring to FIG. 2, a combined image according to step 412 is illustrated. At the top of the figure, down-dip data is illustrated and at the bottom of the figure up-dip data is illustrated. The images for the down and up going waves are located on upper and lower sides of the combined image across the well where the down-going image is up-side-down.

Figure 3:
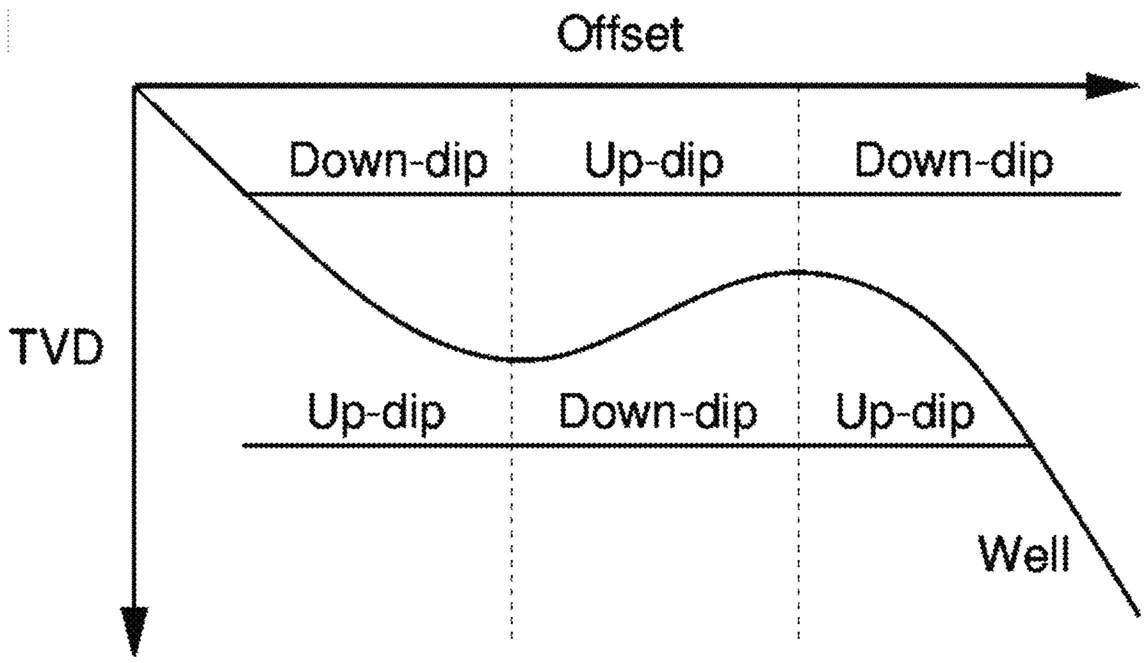
FIG. 3 is an image portion of a function that is flipped, and the total image is adjusted to Earth coordinates.

Referring to FIG. 3, an image portion of f(x)<0 is flipped and the total image is adjusted to the Earth coordinates. The middle portion of the image is flipped.

The combination of X and Y dipole waveforms not only simplifies the data processing workflow but also significantly enhances the detection of geological features. This is especially important in complex geological environments where traditional methods might struggle to provide clear and accurate results. The enhanced waveforms allow geologists and engineers to better understand the subsurface structures, leading to more informed decisions regarding drilling and exploration activities. Moreover, the improved processing techniques contribute to a more efficient and cost-effective evaluation process, as they minimize the need for extensive and repetitive measurements. Waveforms acquired by sonic logging tools are used to image/map geological structures around the borehole. Independent X- and Y-directional sources are used for the dipole measurements, and they are separately acquired and processed.

In another example embodiment, independent X- and Y-directional sources are used for the dipole measurements, and they are separately acquired and processed. In embodiments, methods are disclosed that combine the X- and Y-dipole waveforms to enhance event signals and to reduce the processing time.

Aspects of the disclosure relate to a multi-azimuth sonic logging tool. A multi-azimuth sonic logging tool has M receiver stations in the depth direction, and each receiver station has N azimuthal receivers where N is even. The azimuth interval of receivers is given by:

$$\Delta\theta = \frac{2\pi}{N}. \quad \text{Equation 2}$$

In the present disclosure, azimuths are defined at the center of the borehole to describe positions of the tool. $\theta_{bh}$ is the borehole azimuth measured clockwise from the north or top, $\theta_{tool}$ is the tool azimuth measured clockwise from the first receiver azimuth, and $\theta_{rb}$ is the relative bearing which is the first receiver azimuth measured clockwise from $\theta_{bh}=0$. $\theta_S$ is the source polarization azimuth measured clockwise from $\theta_{tool}=0$. The azimuthal receivers are indexed in the direction of $\theta_{tool}$.

Figure 5:
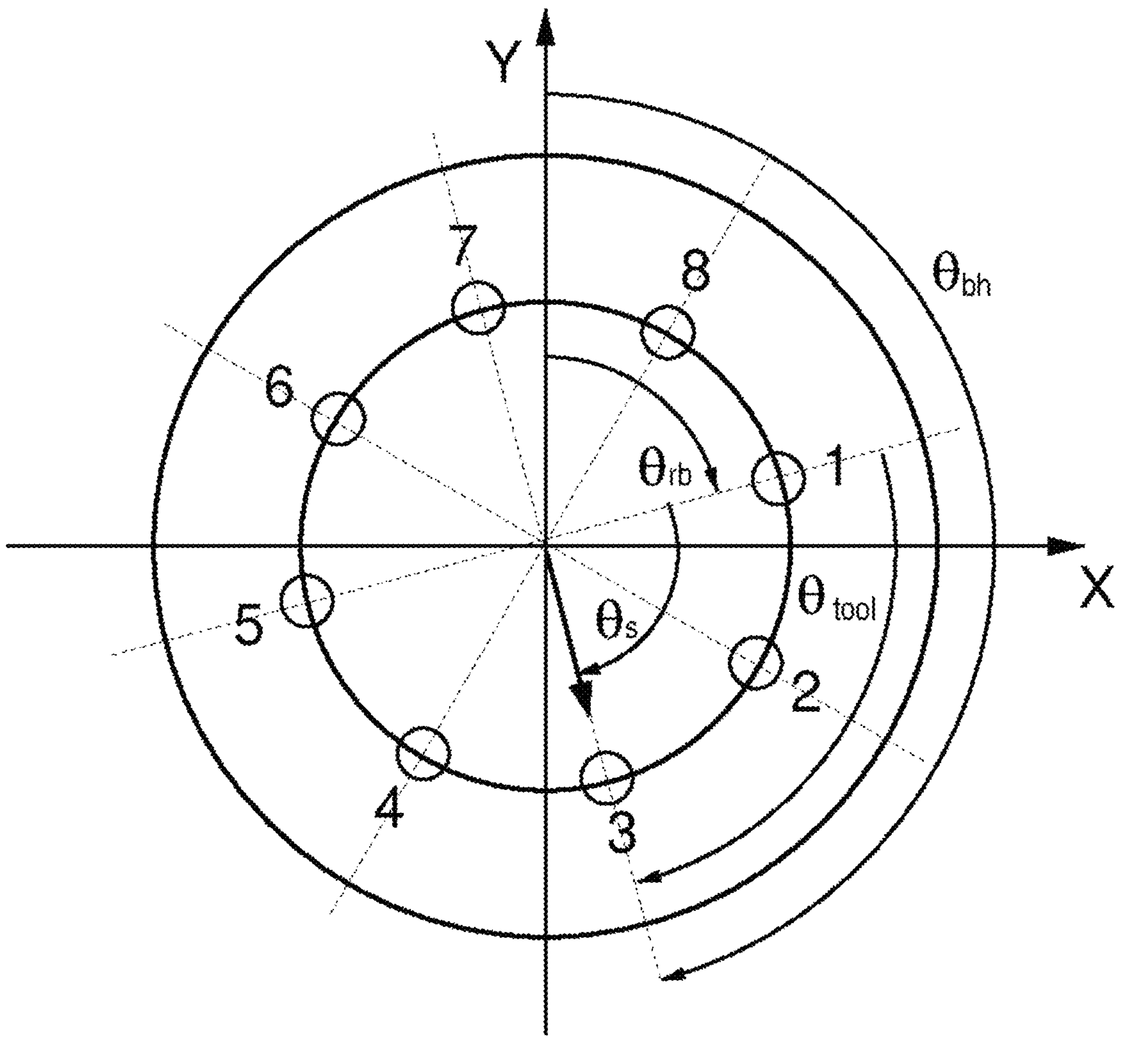
FIG. 5 is a top view of a borehole and associated tool.

Referring to FIG. 5, a top view of a borehole is illustrated. The number, N, of azimuthal receivers equals 8. The numbered small circles show each azimuthal receiver and the arrow shows the source polarization vector. In this embodiment, the tool has X- and Y-dipole sources, and their depth positions can be different. The waveform for a fixed borehole azimuths is constructed for each receiver station.

Stacking and Beamforming Workflow

Figure 6:
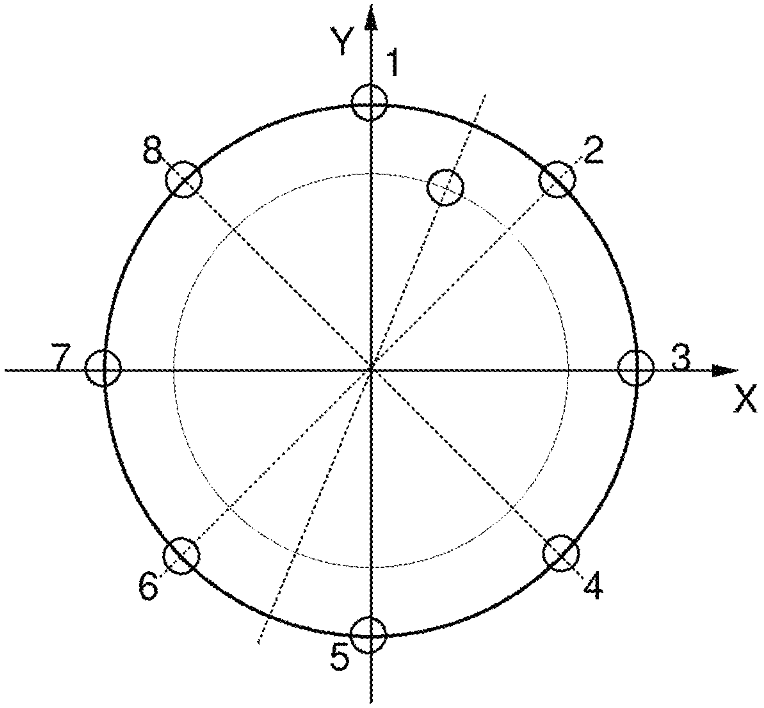
FIG. 6 is an illustration of a stacking method A for illustrated receivers in one example embodiment of the disclosure.

Referring to FIG. 6, the waveforms are stacked using all azimuthal receivers for a virtual receiver (A) as:

$$W_{vir}\left(\frac{2n-1}{N}\pi\right) = \sum_{i=1}^{N/2}(W_{n+i} - W_{n-i+1}), \quad \text{Equation 3}$$

where n (1≤n≤N) is the index of azimuthal receiver where N is the number of azimuthal receivers, which is even, $W_n$ is the waveform of the n-th azimuthal receiver where the cyclic rule is used as $W_{n+iN}=W_n$ where i is any integer, $W_{vir}$ ($\theta_{vir}$) is the stacked waveform for a virtual receiver defined at azimuth $\theta_{vir}$ which is in between two adjacent receivers and measured clockwise from $\theta_{tool}=0$.

Figure 7:
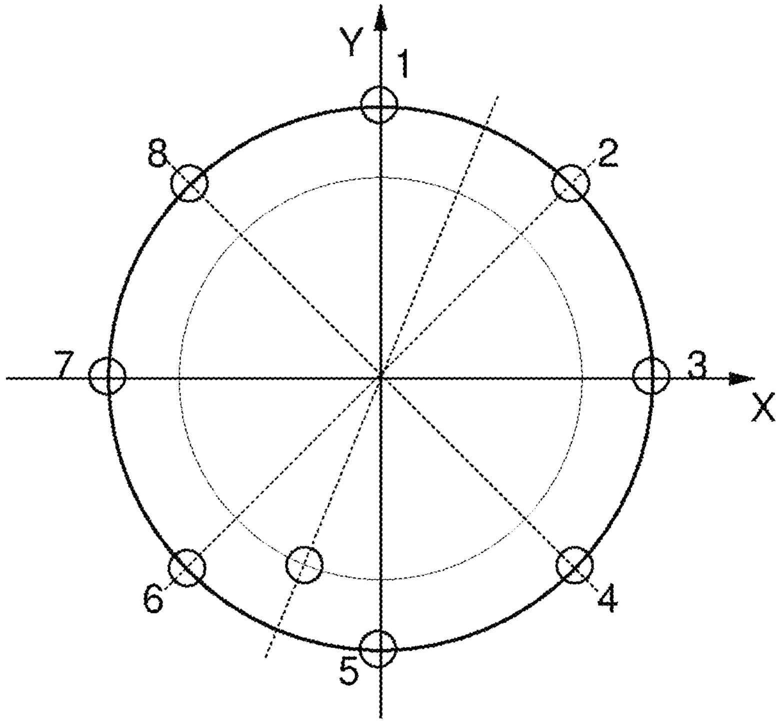
FIG. 7 is an illustration of a stacking method B according to one example embodiment of the disclosure.

Referring to FIG. 7, to resolve 180 degree ambiguities of reflector directions, the stacking method using a half of number of receivers (B) is used as:

$$W_{vir}\left(\frac{2n-1}{N}\pi + \pi\right) = \sum_{i=1}^{N/4}(W_{n+i} - W_{n-i+1}). \quad \text{Equation 4}$$

Further referring to FIG. 7, a stacking method (B) for 8 azimuthal receivers is illustrated. As illustrated, locations 2 and 3 are receivers with a defined positive or plus sign. As further illustrated, locations 8 and 1 are defined as negative. Locations 4 through 7 are neither positive nor negative. The inner circle located between positions 5 and 6 is defined as a virtual receiver where the stacked waveform is defined.

Polarity Modifications for Stacked Waveforms

The polarization vector of the dipole source is given by $$u(\theta_s) = (\sin\theta_s, \cos\theta_s), \quad \text{Equation 5}$$

where $\theta_s$ is the azimuth of the excitation direction which is measured clockwise from the first receiver azimuth. The polarization vectors for the stacked waveform are given for stacking methods (A) and (B) by $$v_A(\theta_{vir}) = \left(\sin\theta_{vir} + \frac{\pi}{2}, \cos\theta_{vir} + \frac{\pi}{2}\right) = (\cos\theta_{vir}, -\sin\theta_{vir}), \quad \text{Equation 6}$$

and $$v_B(\theta_{vir}) = -\left(\sin\theta_{vir} + \frac{\pi}{2}, \cos\theta_{vir} + \frac{\pi}{2}\right) = -(\cos\theta_{vir}, -\sin\theta_{vir}), \quad \text{Equation 7}$$

respectively, where $\theta_{vir}$ is the azimuth of the virtual receiver, which is measured clockwise from the first receiver azimuth. The sign of waveforms is flipped as $$W'_{vir}(\theta_{vir}) = -W_{vir}(\theta_{vir}), \quad \text{Equation 8}$$

when $u(\theta_s)v_A(\theta_{vir})<0$ or $u(\theta_s)v_B(\theta_{vir})<0$ holds. Hereafter, $$W'_{vir}(\theta_{vir})$$

is written as $W_{vir}(\theta_{vir})$ for simplicity.

Combining Waveforms for X- and Y-Dipole Sources

After obtaining the stacked waveforms for the fixed tool azimuths for the X- and Y-dipole waveforms, which are polarization modified, these waveforms are combined. If the source and receiver positions for the X- and Y-dipole waveforms are the same, the waveforms are simply added. If the source and receivers for the common tool positions are different for the X- and Y-dipole, the waveforms are constructed for adjacent tool positions.

Suppose j is the tool position index in the depth direction, the Y-dipole source position is at the deeper position than the X-dipole source position by $m\Delta z$, where m is an integer and $\Delta z$ is the receiver depth position interval. Then, the X-dipole waveforms at (j+m)-th tool position are added to the Y-dipole waveforms at j tool position where the receiver depth positions are the same for the X- and Y-dipole waveforms. The total number of receivers is reduced to M−m where M is the number of receivers in the depth direction because some receiver positions are not overwrapped. The waveforms are combined for each borehole azimuth as $$XY_i = Y_i + X_{i+m}, \quad \text{Equation 9}$$

where $XY_i$, $Y_i$, and $X_{i+m}$ are the waveforms of the fixed borehole azimuths for the combined, Y- and X-dipole waveforms, where i is the receiver depth position index.

Figure 9:
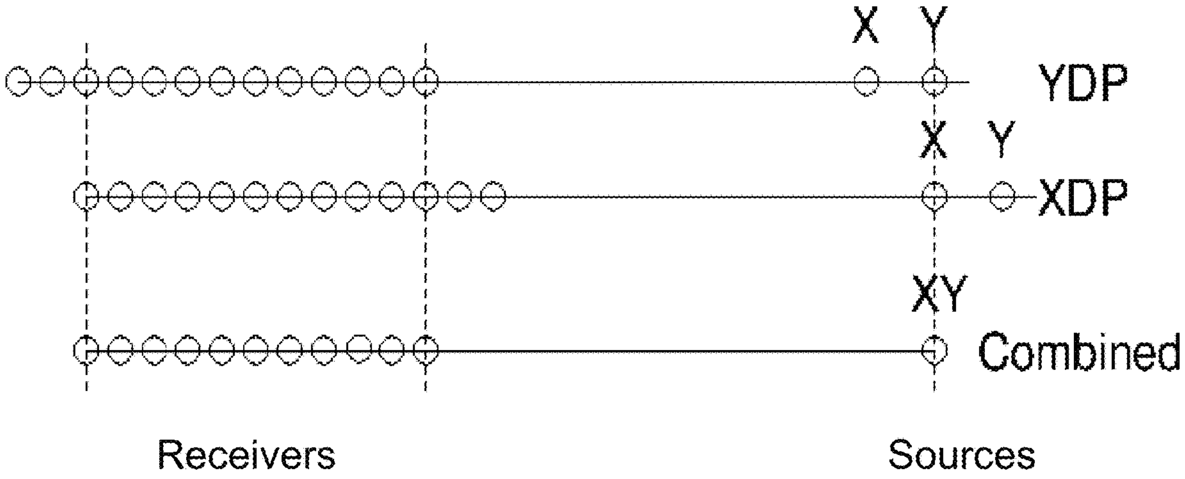
FIG. 9 is an illustration showing different measurement positions for combining X and Y dipole waveforms.
Figure 10:
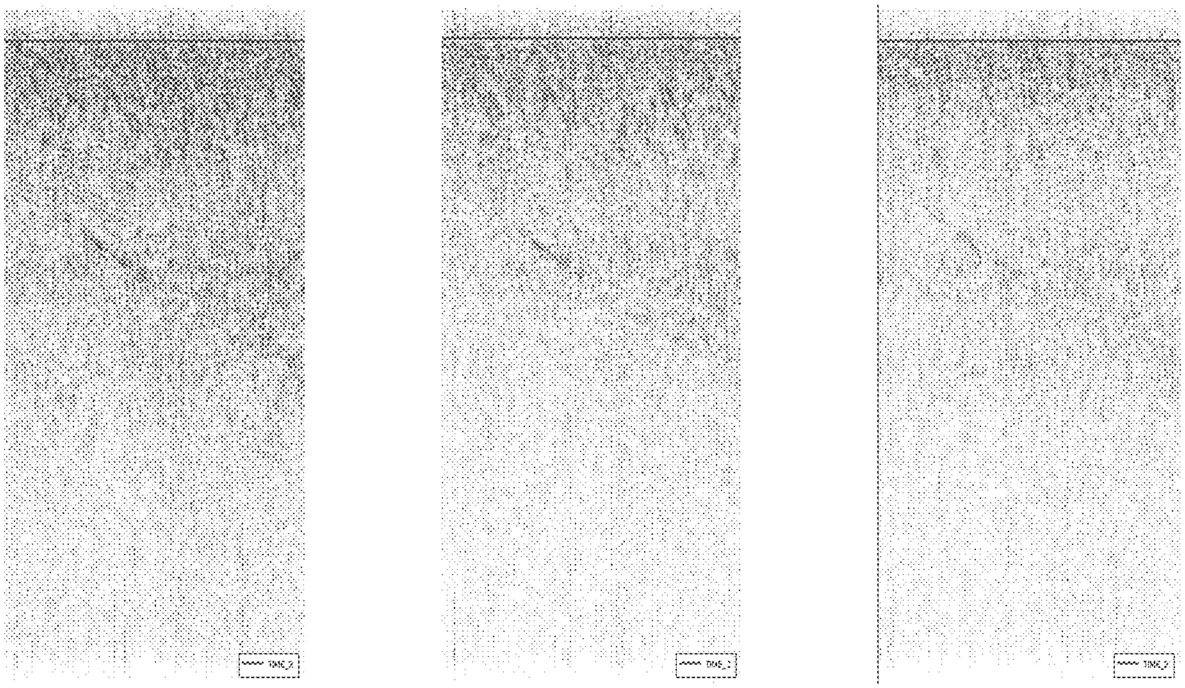
FIG. 10 is an illustration of a combined X and Y dipole waveforms in one example embodiment of the disclosure.
Figure 11:
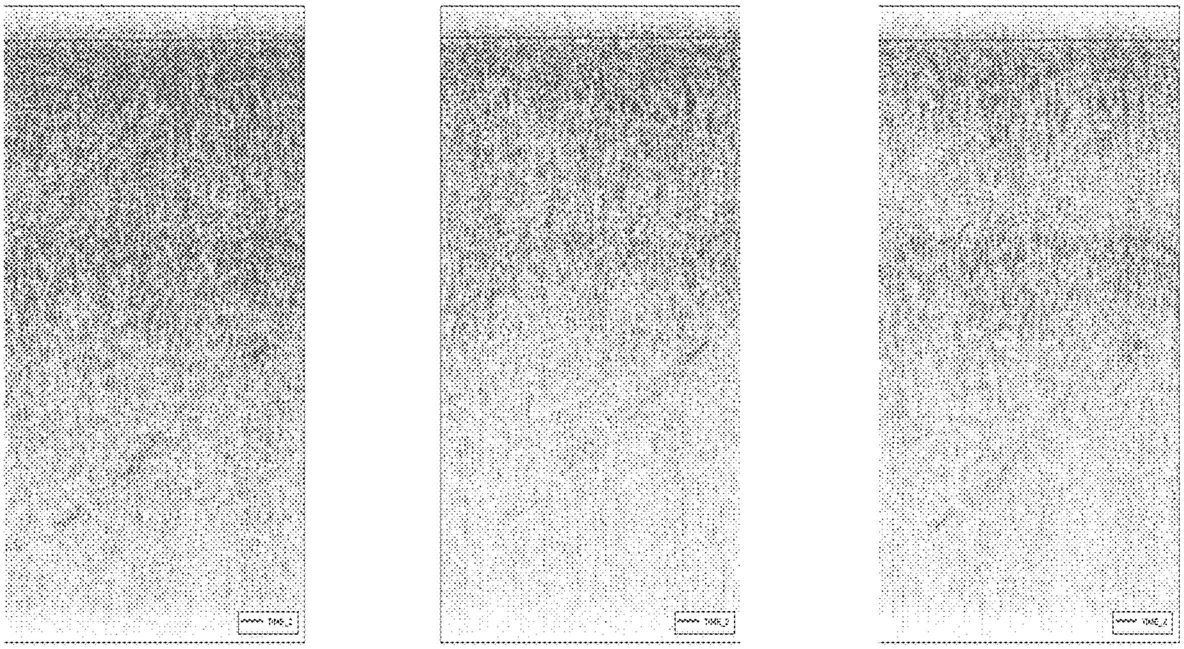
FIG. 11 is an example of combined X and Y dipole waveforms in one example embodiment of the disclosure.

Referring to FIG. 9, tools at different measurement positions for combining the X- and Y-dipole waveforms are illustrated. The Y-dipole and X-dipole waveforms are taken from the top and middle tool positions, respectively. The waveforms are combined for the same receiver positions at the bottom tool position.

Waveforms for Fixed Borehole Azimuths

After obtaining the waveforms for the fixed tool azimuths for the combined X- and Y-dipole waveforms, the waveforms oriented to the fixed borehole azimuths are constructed.

The relation of the borehole and tool azimuths is given by:

$$\theta_{bh} = \theta_{tool} + \theta_{rb}. \quad \text{Equation 10}$$

For given $\theta_{bh}$ and $\theta_{rb}$, $\theta_{tool}$ is given by:

$$\theta_{tool} = \theta_{bh} - \theta_{rb}. \quad \text{Equation 11}$$

To find the closest virtual receiver for a given borehole azimuth, $\theta_{bh}$, it is convenient to define the shifted tool azimuth as:

$$\theta'_{tool} = \theta_{tool} - \frac{1}{2}\Delta\theta, \quad \text{Equation 12}$$

where $$\theta'_{tool}$$

is modified by using the cyclic rule so that $$0 \le \theta'_{tool} < 2\pi$$

holds. The closest virtual receiver index is searched for by:

$$n = \left\lfloor \frac{\theta'_{tool}}{\Delta\theta} + \frac{1}{2} \right\rfloor, \quad \text{Equation 13}$$

where n is the integer ($n \ge 0$), and $\lfloor . \rfloor$ is the floor function.

Figure 8:
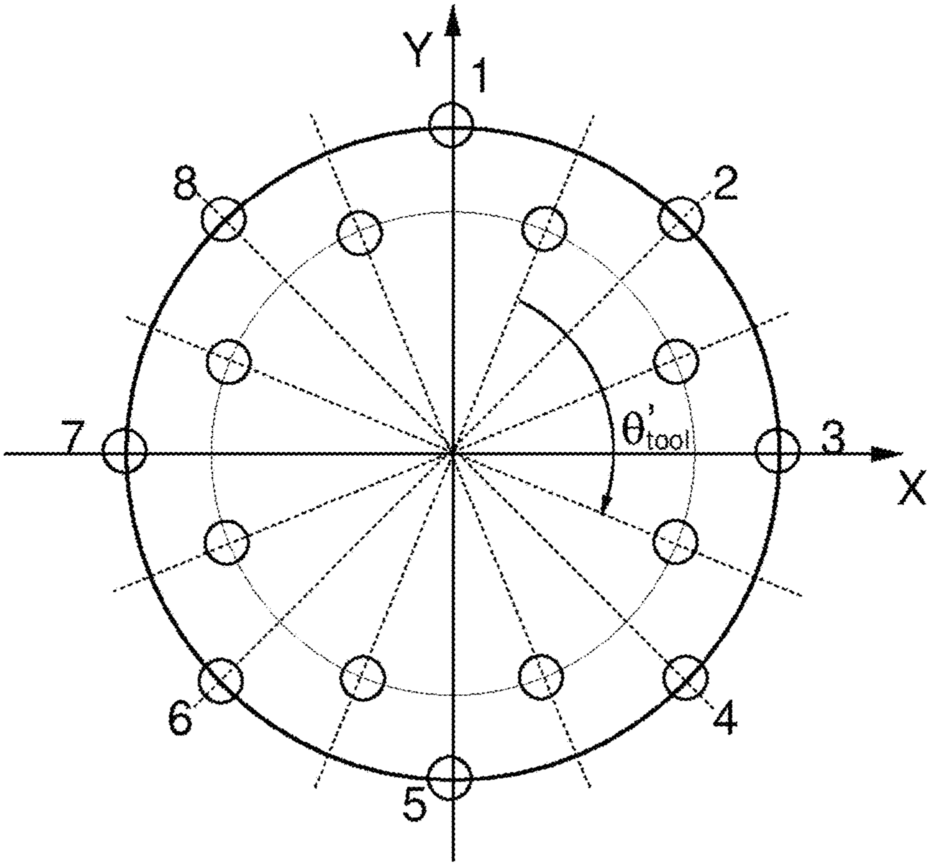
FIG. 8 is an illustration showing receivers and virtual receivers respectively.

Referring to FIG. 8, a definition of $$\theta'_{tool}$$

is provided. The circles at the outer edge of the figure located at positions 1, 2, 3, 4, 5, 6, 7 and 8 are receivers. The circles positioned within the inner location are virtual receivers.

The difference of $$\theta'_{tool}$$

and the closest azimuth of the virtual receiver is given by $$\delta\theta = \theta'_{tool} - n\Delta\theta, \quad \text{Equation 14}$$

Waveform for a fixed given borehole azimuth, $W_{bh}(\theta_{bh})$, for the single X- and Y-dipole sources are given using the quadratic interpolation (or interpolation using Lagrange polynomial) as:

$$W_{bh}(\theta_{bh}) = c_0 W_{vir}\left((n-1)\Delta\theta + \frac{\Delta\theta}{2}\right) + c_1 W_{vir}\left(n\Delta\theta + \frac{\Delta\theta}{2}\right) + c_2 W_{vir}\left((n+1)\Delta\theta + \Delta\theta/2\right) \quad \text{Equation 15}$$

where:

$$c_0 = \frac{Q\delta\theta^2}{2R},\ c_1 = \frac{P(\Delta\theta-\delta\theta)^2 - Q(\Delta\theta+\delta\theta)^2}{2R},\ c_2 = -\frac{P\delta\theta^2}{2R}, \quad \text{Equation 16}$$

where:

$$P = \frac{1}{2}\delta\theta\Delta\theta(\Delta\theta+\delta\theta), \quad \text{Equation 17}$$

$$Q = \frac{1}{2}\delta\theta\Delta\theta(\Delta\theta-\delta\theta), \quad \text{Equation 18}$$

$$R = \frac{1}{2}P\Delta\theta(\Delta\theta-2\delta\theta) - \frac{1}{2}Q\Delta\theta(\Delta\theta+2\delta\theta). \quad \text{Equation 19}$$

Example embodiments of the claims are disclosed. The disclosure of the features of the claims should not be considered limiting of the disclosure. In one example embodiment, a method for processing sonic images is disclosed. The method may comprise sending a sonic signal into a geological stratum. The method may further comprise receiving a reflected sonic signal from the geological stratum. The method may further comprise filtering the reflected sonic signal to produce a filtered waveform. The method may further comprise performing an FK filtering on the filtered waveform to produce FK filtered data, wherein purely horizontal waves are kept in one of an up-going or a down-going wave. The method may further comprise applying a migration of the FK filtered data. The method may further comprise creating a migration image of data after the migration of the FK filtered data. The method may further comprise performing a derivative of a depth position on the data of the migration image to produce derivative results. The method may further comprise adjusting the derivative results to earth coordinates.

In another example embodiment, the method may further comprise saving data related to the reflected sonic signal from the geological stratum.

In another example embodiment, the method may be performed wherein the method is performed in a field location.

In another example embodiment, the method may be performed wherein an operator chooses when the purely horizontal waves are kept in the up-going or the down-going wave.

In another example embodiment, the method may be performed wherein the migration is separately applied to the up-going and down-going wave.

In another example embodiment, the method may be performed wherein coordinates of a measurement depth and depth from a borehole are used in the migration.

In another example embodiment, the method may be performed wherein in the migration image the up-going and down-going waves are combined.

In another example embodiment, the method may be performed wherein that down-going and up-going portions of the migration are on the top and bottom sides of a single image and wherein a measurement position is located at a center of the image.

In another example embodiment, a method for analysis of an acoustic signal is disclosed. The method may comprise placing a multi-azimuth logging tool within a geological stratum to be evaluated. The method may further comprise activating the multi-azimuth logging tool and sending a signal into the geological stratum. The method may further comprise receiving reflected signals by the multi-azimuth logging tool. The method may further comprise stacking waveforms of the reflected signal. The method may further comprise performing a polarity modification of the received reflected signals. The method may further comprise combining polarity modified signals for both X- and Y-dipole waveforms.

In another example embodiment, the method may be performed wherein the stacking of the waveforms is accomplished by defining virtual receivers for the multi-azimuth logging tool.

In another example embodiment, the method may be performed wherein a closest virtual receiver is defined for each borehole azimuth.

In another example embodiment, the method may be performed wherein the polarity modification is applied.

In another example embodiment, the method may be performed wherein the X- and Y-dipole waveforms are the same, the X- and Y-dipole waveforms are added together, and when the X- and Y-dipole waveforms are different, waveforms are constructed using adjacent tool positions.

In another example embodiment, the method may be performed wherein a quadratic interpolation is used to obtain the waveforms at the fixed borehole azimuths.

In another example embodiment, the method may be performed wherein the activating the multi-azimuth logging tool and sending the signal into the geological stratum includes an X-dipole source and a Y-dipole source.

In another example embodiment, the method may be performed wherein the X-dipole source and the Y-dipole source are located at different depth positions.

In another example embodiment, a method for analysis of an acoustic signal within a wellbore for a hydrocarbon recovery project is disclosed. The method may comprise placing a multi-azimuth logging tool within the wellbore in a geological stratum to be evaluated. The method may also comprise sending signals into the geological stratum for at least two sources, wherein a first source is a X-dipole source and a second source is a Y-dipole source. The method may also comprise receiving reflected signals from the geological stratum emitted by the X-dipole source and Y-dipole source by receivers of the multi-azimuth logging tool. The method may also comprise stacking waveforms of the reflected signals. The method may also comprise performing at least one polarity modification of the received reflected signals. The method may also comprise combining waveforms. The method may also comprise constructing waveforms at the fixed borehole azimuths.

In another example embodiment, the method may be performed wherein the stacking of the waveforms is accomplished by defining virtual receivers for the multi-azimuth logging tool.

In another example embodiment, the method may be performed wherein a closest virtual receiver is defined for each borehole azimuth.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method for analysis of an acoustic signal, comprising:

placing a multi-azimuth logging tool within a geological stratum to be evaluated;

activating the multi-azimuth logging tool and sending a signal into the geological stratum;

receiving, by virtual receivers of the multi-azimuth logging tool, reflected signals from the geological stratum;

stacking waveforms of the reflected signals at positions of the virtual receivers, wherein the stacking waveforms is accomplished by defining the virtual receivers for the multi-azimuth logging tool, and wherein each virtual receiver is defined in between two azimuthal receivers of the multi-azimuth logging tool;

performing a polarity modification of the stacked waveforms;

combining polarity modified stacked waveforms for both X- and Y-dipole waveforms; and constructing waveforms at fixed borehole azimuths.

2. The method according to claim 1, wherein the polarity of the stacked waveforms is modified according to a source polarization and the positions of the virtual receivers.

3. The method according to claim 1, wherein source and receiver positions of the X- and Y-dipole waveforms are the same, the X- and Y-dipole stacked waveforms are added together, and when the source and receiver positions of the X- and Y-dipole waveforms are different, stacked waveforms are added using the stacked waveforms of adjacent tool positions.

4. The method according to claim 1, wherein a quadratic interpolation is used to obtain the waveforms at the fixed borehole azimuths.

5. The method according to claim 1, wherein the activating the multi-azimuth logging tool and sending the signal into the geological stratum includes an X-dipole source and a Y-dipole source.

6. The method according to claim 4, wherein the X-dipole source and the Y-dipole source are located at different depth positions.

7. The method according to claim 1, wherein source and receiver positions of the X- and Y-dipole waveforms are the same, the X- and Y-dipole stacked waveforms are added together, and when the source and receiver positions of the X- and Y-dipole waveforms are different, stacked waveforms are added using the stacked waveforms of adjacent tool positions.

8. The method according to claim 1, wherein a quadratic interpolation is used to obtain the waveforms at the fixed borehole azimuths.

9. The method according to claim 1, wherein the activating the multi-azimuth logging tool and sending the signal into the geological stratum includes an X-dipole source and a Y-dipole source.

10. The method according to claim 9, wherein the X-dipole source and the Y-dipole source are located at different depth positions.

11. A method for processing sonic images, comprising:

sending a sonic signal into a geological stratum;

receiving a reflected sonic signal from the geological stratum;

filtering the reflected sonic signal to produce a filtered waveform;

performing an FK filtering on the filtered waveform to produce FK filtered data, wherein purely horizontal waves are kept in one of an up-going or a down-going wave, and wherein an operator chooses when the purely horizontal waves are kept in the up-going or the down-going wave;

applying a migration of the FK filtered data;

creating a migration image of data after the migration of the FK filtered data;

performing a derivative of a depth position on the data of the migration image to produce derivative results; and adjusting the derivative results to earth coordinates.

12. The method according to claim 11, further comprising:

saving data related to the reflected sonic signal from the geological stratum.

13. The method according to claim 11, wherein the method is performed in a field location.

14. The method according to claim 11, wherein the migration is separately applied to the up-going and down-going wave.

15. The method according to claim 14, wherein coordinates of a measurement depth and depth from a borehole are used in the migration.

16. The method according to claim 14, wherein in the migration image the up-going and down-going waves are combined.

17. The method according to claim 16, wherein down-going and up-going portions of the migration are on top and bottom sides of a single image and wherein a measurement position is located at a center of the single image.

18. A method for analysis of an acoustic signal, comprising:

placing a multi-azimuth logging tool within a geological stratum to be evaluated;

activating the multi-azimuth logging tool and sending a signal into the geological stratum;

receiving, by virtual receivers of the multi-azimuth logging tool, reflected signals from the geological stratum;

stacking waveforms of the reflected signals at positions of the virtual receivers;

performing a polarity modification of the stacked waveforms, wherein the polarity of the stacked waveforms is modified according to a source polarization and the positions of the virtual receivers;

combining polarity modified stacked waveforms for both X- and Y-dipole waveforms; and constructing waveforms at fixed borehole azimuths.

* * * * *